United States Patent
Witzel et al.

(10) Patent No.: US 8,532,091 B2
(45) Date of Patent: Sep. 10, 2013

(54) METHOD AND APPARATUS FOR PROVIDING IMS SERVICES TO CIRCUIT-SWITCHED CONTROLLED TERMINALS

(75) Inventors: Andreas Witzel, Herzogenrath (DE); Ralf Keller, Würselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 843 days.

(21) Appl. No.: 12/161,134

(22) PCT Filed: Jan. 19, 2006

(86) PCT No.: PCT/EP2006/000470
§ 371 (c)(1),
(2), (4) Date: Nov. 19, 2009

(87) PCT Pub. No.: WO2007/082551
PCT Pub. Date: Jul. 26, 2007

(65) Prior Publication Data
US 2010/0150133 A1    Jun. 17, 2010

(51) Int. Cl.
*H04L 12/66* (2006.01)
(52) U.S. Cl.
USPC ........... 370/352; 370/353; 370/354; 370/355; 370/356
(58) Field of Classification Search
USPC ........................................ 370/260, 352–356
See application file for complete search history.

(56) References Cited

U.S. PATENT DOCUMENTS

| | | | |
|---|---|---|---|
| 6,741,695 B1 * | 5/2004 | McConnell et al. | 379/229 |
| 6,871,070 B2 * | 3/2005 | Ejzak | 455/435.1 |
| 2002/0110104 A1 | 8/2002 | Surdila et al. | |
| 2002/0191596 A1 * | 12/2002 | Moyano et al. | 370/352 |
| 2003/0169729 A1 * | 9/2003 | Bienn et al. | 370/353 |
| 2004/0062271 A1 * | 4/2004 | Oliver et al. | 370/466 |
| 2004/0190498 A1 * | 9/2004 | Kallio et al. | 370/352 |
| 2005/0141528 A1 * | 6/2005 | Matsuhashi et al. | 370/401 |
| 2005/0157708 A1 * | 7/2005 | Chun | 370/356 |
| 2005/0286531 A1 * | 12/2005 | Tuohino et al. | 370/395.2 |
| 2006/0133353 A1 * | 6/2006 | Wang et al. | 370/352 |
| 2006/0146714 A1 * | 7/2006 | Harris et al. | 370/236 |
| 2006/0206504 A1 * | 9/2006 | Cai et al. | 707/100 |
| 2010/0034166 A1 * | 2/2010 | Olvera-Hernandez | 370/331 |

OTHER PUBLICATIONS

3GPP SA WG2: "Combining Circuit Switched (CS) and IP Multimedia Subsystem (IMS) services; Stage 2 V7.1.0 (Release 7)" Dec. 2005.

\* cited by examiner

*Primary Examiner* — Luat Phung
*Assistant Examiner* — Kai Chang (57) ABSTRACT

The present invention proposes a solution for providing IMS services to users having circuit-switched controlled terminals being not adapted to provide IMS services to the users. In particular, it is proposed, in order to allow IMS to take the full call and service control, to place a user agent being responsible for the user ported to the IMS in a new node type called Mobile Access Gateway Control Function (MAGCF). This new node combines the logical functionality of a cellular switching center and the logical functionality of IMS. The invention discusses a concept of a static MAGCF being deployed in a network and being assigned for handling a user.

10 Claims, 7 Drawing Sheets

METHOD AND APPARATUS FOR PROVIDING IMS SERVICES TO CIRCUIT-SWITCHED CONTROLLED TERMINALS

TECHNICAL FIELD OF THE INVENTION

The present invention relates to providing IMS service to a user having circuited-switched controlled user's equipment.

BACKGROUND

Third Generation (3G) Networks such as UMTS (Universal Telecommunication Network) and CDMA 2000 provide high-speed wireless Internet access to mobile users over a wide coverage area. For the 3G networks the IP Multimedia Subsystem IMS has been defined to provide cellular access to the services of the Internet in order to support telephony and multimedia services. The IMS uses packet-based technology, in particular IP-network and other IETF protocols for provision of services. The strength of IMS is the provision of enhanced Services, for example multimedia services combining voice and data. Further, the usage of IP-network as a single underlying standard allows an easy and fast service deployment. In contrary, 2nd Generation networks, like GSM, provide voice based on a circuit-switched technology A Session Initiation Protocol SIP has been chosen in IMS for signalling between the user's equipment UE and the IMS as well as between the components within the IMS. The IMS uses SIP also to complete voice and multimedia calls in the Internet. In order to be able to use the IMS service, the communicating user's equipment has to support IMS, which means SIP has to be implemented in the user's equipment.

In the following simplified network architectures of IMS is described. In particular the nodes being involved in provision of service in IMS architecture are mentioned.

The components of the IMS system are the Call Session Control Function (CSCF), the Media Gateway (MGW)/Media Gateway Control Function (MGCF), the Home Subscriber Register (HSR), the Application Server (AS).

The CSCF acts as a call server and handles call signalling, it supports and controls the multimedia sessions and performs address translation functions. The CSCF can be functionally decomposed to S-CSCF, I-CSCF and P-CSCF. The Proxy-CSCF (P-CSCF) is the first contact point in a visited IMS network and it provides authorization of bearer resources, further it forwards a SIP register request received from the User Equipment UE to an I-CSCF determined using the home domain name, as provided by the UE. In the opposite direction it forwards the SIP request or response to the UE. Moreover the CSCF forwards SIP messages received from the UE to a SIP server (S-CSCF) whose name the P-CSCF has received as a result of the registration procedure.

The Interrogating-CSCF (I-CSCF) is the contact point within an operator's network for all connections destined to a subscriber of that network operator, or a roaming user currently located within that network operator's service area. There may be multiple I-CSCFs within an operator's network. The main function performed by the I-CSCF is assigning a S-CSCF to a user performing SIP registration. The Serving Call Session Control Function (S-CSCF) is the node that performs the session management for the IMS network. There can be several S-CSCFs in the network. The main functions of S-CSCF include: acceptation of registration support of services. Further it provides endpoints with service event related information (like for example notification of tones/announcement together with location of additional media resources, billing notification).

The Home Subscriber Register HSR is the centralized subscriber database. The HSR interfaces with the I-CSCF and the S-CSCF to provide information about the location of the subscriber and the subscriber's subscription information. The HSR is responsible for holding the following user related information: user identification, numbering and addressing information, user security information for authentication and authorization. The HSR supports the user registration, and stores inter-system location information.

The IMS supports inter-working with legacy networks. This support is provided by the Media Gateway Control Function (MGCF).

The MGCF performs protocol conversion between cellular call control protocols and IMS protocols. For example, the MGCF receives a SIP message from the CSCF and converts it into appropriate ISUP messages. Thus, the primary function of MGCF is to convert signalling information from one format to another in uplink and downlink direction. In UMTS this will predominantly be between Pulse Code Modulation (PCM) in the PSTN and an IP based format.

As already mentioned the UMTS system allows mobiles operating in packet mode to establish voice calls using SIP as the signalling protocol. The SIP messages are sent to communicate the request to the Call Session Control Function (CSCF) in the IMS. In this case, the data is transmitted as packets throughout the UMTS network. However in order to access any service in IMS the user has to perform a registration procedure in the IMS system. Said registration procedure is performed by means of an user agent being implemented in the user's equipment.

Thus, the IMS has been deployed for the 3G networks for provision of services using packet-based technology with SIP as applied signalling protocol. However, currently the major numbers of user's equipment do not support IMS technology with SIP as signalling protocol for voice service, since said user's equipment is adapted for a circuit-switched controlled domain. Thus, for the access to the IMS an adaptation of the user's equipment is necessary.

SUMMARY AND DESCRIPTION OF THE INVENTION

Therefore, it is an object of the present invention to provide a solution for providing IMS services to user's equipment operating in circuit-switched controlled domain.

The invention is disclosed in the independent claims. Advantageous embodiments are described in the dependent claims being disclosed in the corresponding parts of the description.

According to the present invention it is proposed to provide an Access Gateway Node adapted to provide access to an packet-based multimedia system, like for example to a IMS for a circuit-switched controlled user's terminal located in circuit-switched controlled domain, like for example in a GSM. It is proposed that said node comprises a circuit-switched function adapted to receive a trigger message related to the circuit-switched controlled user's terminal from the circuit-switched controlled domain including circuit-switched related parameter. This parameter might be for example an IMSI address used in the circuit-switched domain. Further it is proposed that the Access Gateway Node comprises conversion logic adapted to derive from the circuit-switched related parameter at least one packet-based multimedia system parameter. This might be for example the private user ID and the temporary public ID as used in the IMS.

There might be other parameters which are needed for handling call in the packet-based multimedia system. Further it is proposed that the Access Gateway Node comprises a packet-based multimedia logic adapted to provide an access to the packet-based multimedia system based on the at least one packet-based multimedia system parameter. Herein it is to be understand that access means for example a registration of the user in the packet-based multimedia system or handling of calls for users being already registered in the packet-based multimedia system.

Moreover the present invention proposes a method for providing access to an packet-based multimedia system for a circuit-switched controlled user's terminal located in circuit-switched controlled domain. In the frame of the method it is proposed that a circuit-switched function being part of a Access Gateway Node receives a trigger message related to the circuit-switched controlled user's terminal from the circuit-switched controlled domain including circuit-switched related parameter, like for example some addresses (like IMSI) used in the circuit-switched domain. Further the circuit-switched function provides the received circuit-switched related parameter to a conversion logic being part of the Access Gateway Node The task of said conversion unit is to derive from the circuit-switched related parameter at least one packet-based multimedia system parameter. This might be for example any address needed for registration of the user in the packet-based multimedia system or any parameters needed for providing call handling between the two systems, namely the circuit-switched domain and the packet-based multimedia system. A packet-based multimedia logic being part of the Access Gateway Node provides an access to the packet-based multimedia system based on the packet-based multimedia system parameter for the circuit-switched controlled terminal.

The advantage of the present invention is that it provides a smooth migration from a circuit-switched domain to a packet-based domain. In particular for a user with a circuit-switched adapted equipment a solution is given to use IMS service.

Further advantageous embodiments are described in the dependent claims.

In the following preferred examples of the present invention shall be described in detail, in order to provide the skilled person with thorough and complete understanding of the invention, but these detailed embodiments only serve as examples of the invention and are not intended to be limiting. The following description shall make reference to the enclosed drawings, in which.

It should be noted that the term "entity", "node", "module", in the context of the present invention refers to any suitable combination of hardware and software for providing a predetermined functionality in the communication network. In this way, said terms generally refers to a logical entity that can be spread out over several physical entities, but can also refer to a physical entity located in one physical location, if no explicit definition is given.

It should be noted that the term "user" in the context of the present invention refers to circuit-switched controlled user equipment, wherein said user equipment is a combination of hardware and software. However in the following description the terms "user" and "user equipment" should be seen as having the same meaning, if it is not stated differently.

Preferably, the communication network is a mobile communication network, e.g. is a wireless communication network operating according to GSM, or GPRS (General Packet Switched Radio) or any 3G system like for example UMTS (Universal Mobile Telephone System), EDGE, and CDMA2000.

According to the present invention it is proposed, in order to allow IMS to take the full call and service control, to combine the logical functionality of a cellular switching center and the logical functionality of IMS in an Access Gateway Node, which is called in the following MAGCF. In particular it is proposed that this new MAGCF node comprises a serving circuit-switched functionality like for example MSC or a GMSC-S for terminating calls to a roaming user in a network or optionally gsmSCF for originating calls for a roaming user. Further it is proposed that the MAGCF has packet-based multimedia functionality which is in particular an user agent and/or a proxy call control function, like for example the P-CSCF.

In general it might be said that the MAGCF handles in the packet-based multimedia domain on behalf of the user with a circuited-switched terminal. Further it is proposed that the MGCF performs protocol conversion between cellular call control protocols and IMS protocols.

Figure 1:
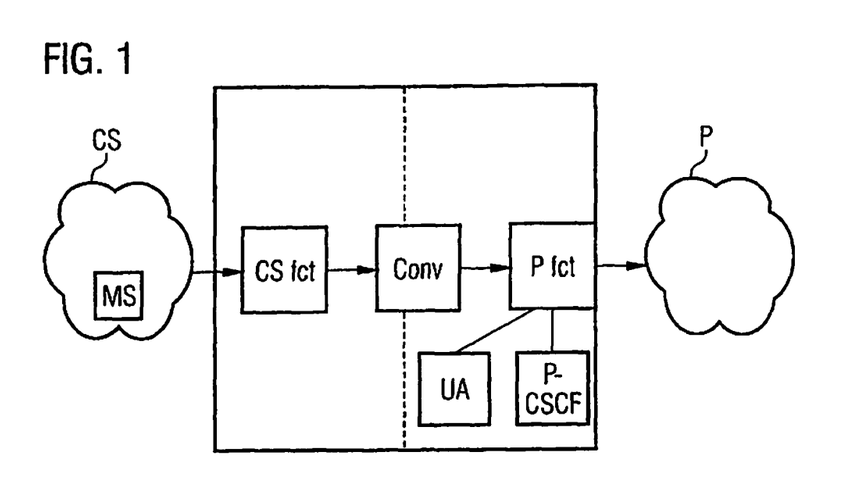
FIG. 1 shows a schematic representation of an architecture of Access Gateway Node according to the present invention.

FIG. 1 presents schematically a structure of a MAGCF being a static anchor point for the user's circuited-switched control terminal MS between a circuited-switched CS network and a packet-based multimedia network P.

There is a circuit-switched logic, CS fct, adapted to receive a trigger message from the circuit-switched controlled domain like for example GSM. Preferably the message is received from a circuit-switched node, like MSC or MSC-S serving the user. The MSC might be either a stand-alone node or it might be integrated in an other MAGCF. Generally, the circuit-switched function is preferably a function fulfilling the functionality of MSC. Thus, it has all the functions being required to exchange signalling with the cellular-switched controlled network, in which a user is located, wherein the communication with the user is performed over a radio interface. The communication with the circuit-switched function might be performed by means by any suitably signalling protocol, in case of GSM this might be the well-known Mobile Application Protocol MAP or ISUP or BICC.

Independent of the implementation of the MSC, in the next step the MAGCF analyzes circuit-switched trigger in the conversion unit, Conv, in order to derive packet-based multimedia parameters needed for providing an access of the user to the packet-based multimedia system P. A packet-based multimedia logic P fct fulfils the task for providing the access, wherein under access as well registration of the user as well the provision of any packet-based multimedia services, including call handling, is meant.

According to the invention there might be a number of parameters, which is to be used for registration. However in the first place the credentials, like the required addresses are to be provided. The derivation of the credentials is described further in respect to FIG. 3.

Returning to FIG. 1, according to the present invention it is proposed to have a user agent UA being part of the packet-based multimedia functionality. Preferably, a SIP agent might perform the task of the user agent being responsible for interacting with the IMS. This includes for example the registration of the user or updating of the user's data in the IMS. Thus, the UA handles on behalf of the circuit-switched user, which means that on behalf of the user a registration by means of the SIP protocol is initiated. According to the IMS a proxy call control function P-CSCF being part of the Access Gateway Node is the first contact point for communicating with IMS. The Proxy-CSCF forwards a SIP messages received from the user agent to S-CSCF. In the opposite direction it forwards the SIP request or response towards the user. Said P-CSCF is also used for the call termination by using the P-CSCF address.

Figure 2:
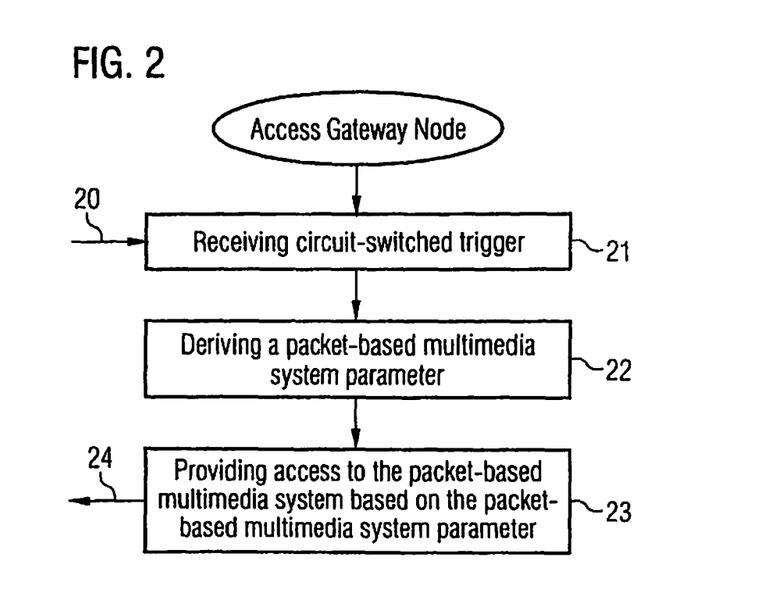
FIG. 2 shows a flowchart of an embodiment of the present invention for a method being to be performed on the Access Gateway Node.

In the following a method according to the present invention is described in respect to FIG. 2. FIG. 2 presents steps which, are to be performed in the MAGCF. In the first step 21 the MAGCF receives a trigger message, 20 from the circuit-switched domain, preferably from a MSC serving the circuit-switched controlled user's terminal. In step 22 the circuited-switched trigger is converted. In particular packet-based multimedia parameter is derived. Said packet-based multimedia parameter is used for registering the user in the IMS system and for handling the circuit-switched user in the IMS domain, in particular for providing packet-based services to said user. After successful registration the user is able to access the services provided in the IMS. Thus, in step 23 the access is prepared and activated, step 24.

In the following different embodiments for the realization of the invention are described.

In the following an embodiment for derivation of packet-based credentials based on the IMS credentials is given in respect to FIG. 3.

Figure 3:
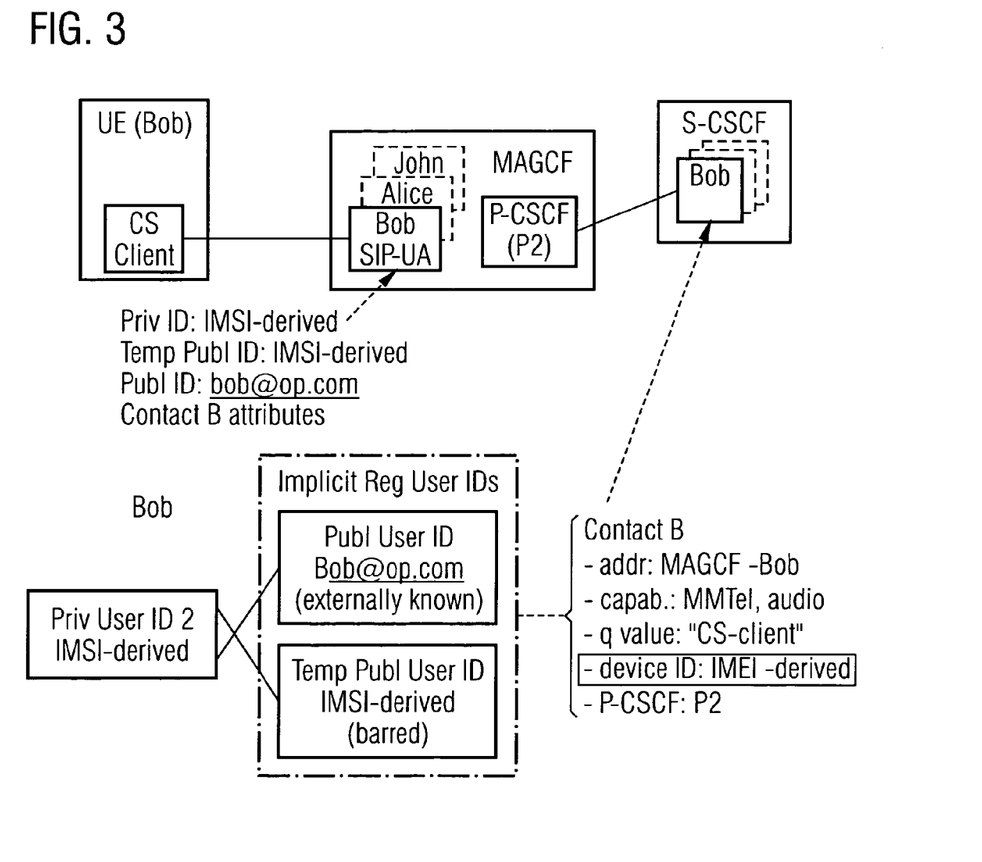
FIG. 3 shows an embodiment of the present invention for providing of a packet-based multimedia system parameter.

FIG. 3 depicts a user UE (Bob) having a circuit switched functionality, CS client communicating with the corresponding packet-based logic located in the MAGCF, Bob SIP-UA. Further the S-CSCF is depicted with an entry for the user, Bob, wherein the content of the entry is depicted in the box depicted below the S-CSCF.

According to the state of the art the private and public addresses required for the registration of the user in the IMS are stored on the SIM card in the user's equipment. According to the present invention the static MAGCF does not have access to any user's IMS credentials, therefore it is proposed that MAGCF derives a private user ID (IMPI) and a temporary public ID (temporary IMPU) from the IMSI of the served subscriber, wherein the IMSI is communicated to the MAGCF during an attach procedure, as it is described further in more details. The procedure for derivation of the IMPI is known.

According to the standard the IMPI has the following form:

<IMSI>@ims.mnc<MNC>.mcc<MCC>.3gppnetwork.org
Wherein
<IMSI> = full IMSI number
<MCC> = Mobile Country Code of the IMSI
<MNC> = Mobile Network Code of the IMSI Based on this notification the derivation comprises the step of using the whole string of digits as the username part of the private user identity and of converting the leading digits of the IMSI, i.e. MNC and MCC, into a domain name. The result is a private user identity of the form "<IMSI>@ims.mnc<MNC>.mcc<MCC>.3gppnetwork.org". For example: If the IMSI is 234150999999999 (MCC=234, MNC=15), the private user identity takes the form 234150999999999@ims.mnc015.mcc234.3gppnetwork.org A SIP URI for a temporary Public User Identity has the form "sip:user@domain" and is therefore equal to the private user identity. The private user identity is derived as described above. Thus, the private user identity is to be appended to the string "sip:", which means for the above example that the temporary public ID takes the form:

"sip:234150999999999@ims.mnc015.mcc234.3gppnetwork.org".

The derived IMPI and IMPU are then used to perform a registration towards IMS. In response to the registration, MAGCF receives the externally known public user ID, like Bob@op.com as it is depicted in FIG. 3. This public user ID is then used by the MAGCF in subsequent re-registrations and session setups.

During the registration MAGCF also provides SIP contact attributes to IMS, including the contact address for each active user, addr:MAGCF-Bob, and user capabilities, like Multimedia Telephony for audio only, capab:MMTel, video, audio. MAGCF could also provide the priority parameter (q-value) used by IMS to decide in which order to try multiple contacts for the user. The q-value used by MAGCF (global value) must be communicated to the end-user in order for them to configure proper q-values for other possible SIP-clients that a user may be reached at.

Figure 4:
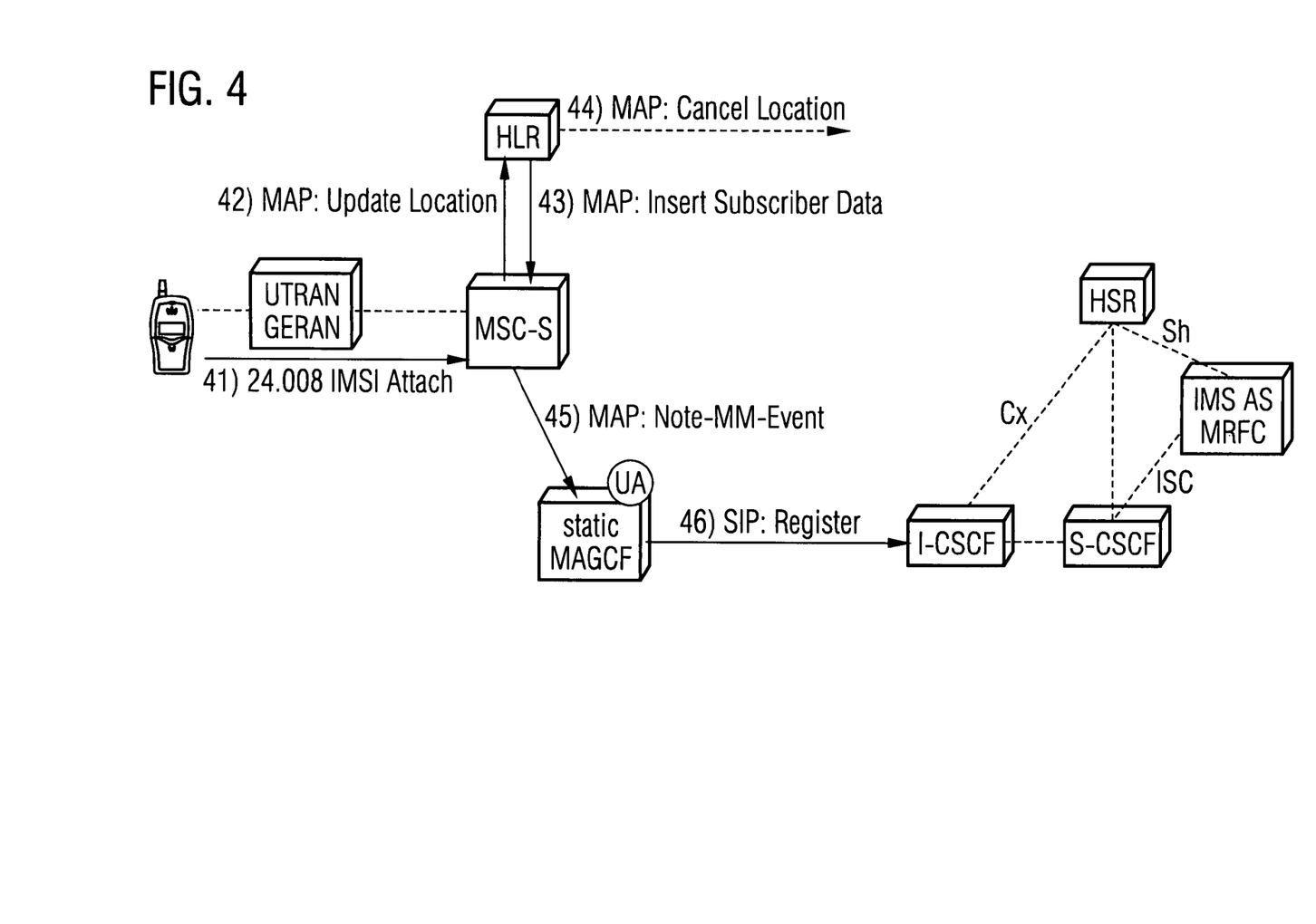
FIG. 4 shows a schematic embodiment for IMSI Attach in MAGCF and IMS registration.

In the following an embodiment of the present invention is described in respect to FIG. 4, presenting the user's registration procedure, including an attach procedure.

FIG. 4 depicts cellular capable user equipment UE communicating with a MSC-S over a UTRAN/GERAN access network. The HLR is depicted as a part of the cellular-switched controlled domain. The depicted static MAGCF node according to the present invention has functionality to communicate with the cellular-switched controlled system and with the IMS system. The IMS system comprises I-CSCF, S-CSCF and HSR nodes. According to the present invention said MAGCF node has the MSC functionality and the IMS functionality in form of user agent UA and P-CSCF. The MAGCF has therefore the capability to communicate with the MSC and with the IMS. Further there is also the IMS Access Server IMS AS for provision of IMS services communicating with HSR and S-CSCF. The sequence of the messages exchange is depicted by means of lines provided with arrows. The dotted lines are provided to show the signalling connections between the nodes.

In the following a traffic case is described, when a user switches on his/her circuit-switched controlled user equipment UE in a home network. In the first step, 41 UE sends an IMSI attach message to the MCS serving the user in order to become reachable via the circuit-switched controlled access. Since this is a new subscriber being not registered in the MSC-S, the responsible HLR is contacted to inform about the location update, 42. In the following step, the HLR checks the requesting subscriber by means of analyzing the IMSI number. In order to provide the IMS functionality to the users, said users has to be ported to the IMS system. In other words, the user has to either announce actively the change to the IMS system or the system might decide to port cellular users to the IMS system. A corresponding notification about the user is to be stated in the HLR. It is to be mentioned, that preferably all mentioned data is to be provided into the subscriber data in the HLR by means of Operation and Maintenance O&M, which has the advantage that no functional modifications are needed in the HLR. In case a user is not ported, it is proposed to apply the standard behaviour for a cellular user like it is already known. In case the user is ported to the IMS, it is proposed that the HLR inserts the subscriber data into MSC-S and in step 44 that it sends a Cancel Location to any previously used MSC node, in order to delete the user's entry in said node. The in step 43 sent MAP message comprises subscriber data containing CAMEL Mobility Trigger and a specific CAMEL Service Key.

The CAMEL approach is taken as an example and it has no restriction to the present invention. In particular in networks without IN-functionality, like the CAMEL functionality, it is proposed to implement any suitable trigger message.

In the following some essential features of a CAMEL network being used in one embodiment of the present invention are mentioned. CAMEL is a network feature which allows the network operator to provide the mobile subscribers with the operator specific services even when mobile subscribers are roaming outside the home network. According to CAMEL architecture, CAMEL Service Control Functionality (gsmSCF) functionality is to be provided in the subscriber's home PLMN, which contains the CAMEL service logic needed to implement operator specific services. Further there is also CAMEL Service Switching Functionality (gsmSSF) taking part in the transaction handling and executing the instructions given from the gsmSCF. Often used protocol for communication between nodes in the CAMEL architecture is the CAMEL Application Part (CAP) protocol. In the frame of CAMEL, a so called Trigger Detection Point (TDP) is defined, which specifies a point of time in transaction handling when the gsmSCF shall be contacted. When the TDP is met the gsmSSF opens a dialog to gsmSCF. There are a number of functionalities defined for the gsmSCF, among other things; the gsmSCF can be provided with information about ongoing transaction, like for example destination address and duration of transaction.

Returning to FIG. 4 the HLR uses the CAMEL functionality to inform the MSC-S about specific subscriber's data. Thus, the HLR sets Trigger Detection Point, the CAMEL Mobility Trigger. Said Mobility Trigger includes contacting data for the gsmSCF, which according to the present invention is the address of the static MAGCF node to be used for the subscriber. Preferably different subscribers may have different MAGCF nodes, or alternatively in a simple case all subscribers may use the same MAGCF. In both cases the address of the MAGCF is to be provided. Further information is to be preferably the CAMEL service key indicating that the subscriber uses IMS services.

Thus, according to FIG. 4, in step 43 the Mobility Trigger in form of MAP:Insert Subscriber Data Message is sent to the MSC-S in order to include said user into the MSC-S identifying the user by means of the IMSI number. The receipt of the Mobility Trigger causes that the MSC-S sends a notification to the static MAGCF, step 45. Said message is preferably a MAP:Note-MM-Event message, which is a standard message used for informing for example a gsmSCF about incoming Mobility Management event. This message comprises according to the standard, among other parameters, like Service Key or Location Information, also the IMSI number of the user. It is to be noted that according to the present invention no functional modifications are needed in the MSC-S.

Upon receipt of the message from the HLR, the MAGCF, in particular the circuit-switched part of the MAGCF, contacts the user agent in order to register and to subscribe the subscriber in the IMS system, steps 46. Preferably the applied protocol for the registration and for the subscription purpose is the SIP protocol, in this case also the user agent has SIP functionality implemented. During the IMS registration, the user agent acts on behalf of the subscriber. All steps necessary for registration like for example, the authorization of the users, are performed by the means of the IMS entities integrated in the MAGCF.

The purpose of the registration procedure is to activate the Public User Identities and to authenticate the user. The registration is performed between the User Agent UA located in the MAGCF and handling on behalf of the user and the S-CSCF by means of the so-called 4-way handshake, comprising sending of a register message, receiving an Unauthorised (Challenge) message requesting the user to send its credentials, sending a Register (response) message with the users credentials and acknowledging the registration with the 200OK message. Thus in order to perform the registration the user has to have the IMS credentials, like the IMPI and IMPU. The first contact with the IMS is performed by means of the public address IMPU and the private IMPI is needed for performing the authentication of the user. Both addresses are derived from the IMSI number, as it is described beforehand, and are sent with the register message to the IMS, in particular to the S-CSCF.

Thus, the result of the registration is that the MAGCF stores the S-CSCF address and the S-CSCF stores the MAGCF address where the registered subscriber can be reached.

According to the present invention it is proposed that when receiving the Note-MM-Event notification, the MAGCF has to check in a predefined list, for example administered by the operator, whether the sending node has MAGCF functionality. In case the sending node has the MAGCF functionality than no further action is required, since the sending MAGCF is responsible for the user. If no, then the MAGCF has to act according to the present invention as static MAGCF and register the subscriber into IMS. In particular it is the task of the static MAGCF to derive the IMS credentials required for registration in IMS. This procedure is described above in respect to FIG. 3.

As a consequence of the procedure according to FIG. 4, the subscriber is attached in the MAGCF from the cellular controlled side and registered in the IMS.

After the subscriber is IMSI attached and registered in IMS, he or she may roam between MSC-S nodes. The change of MSC-S while roaming is described in the following in respect to FIG. 5.

Figure 5:
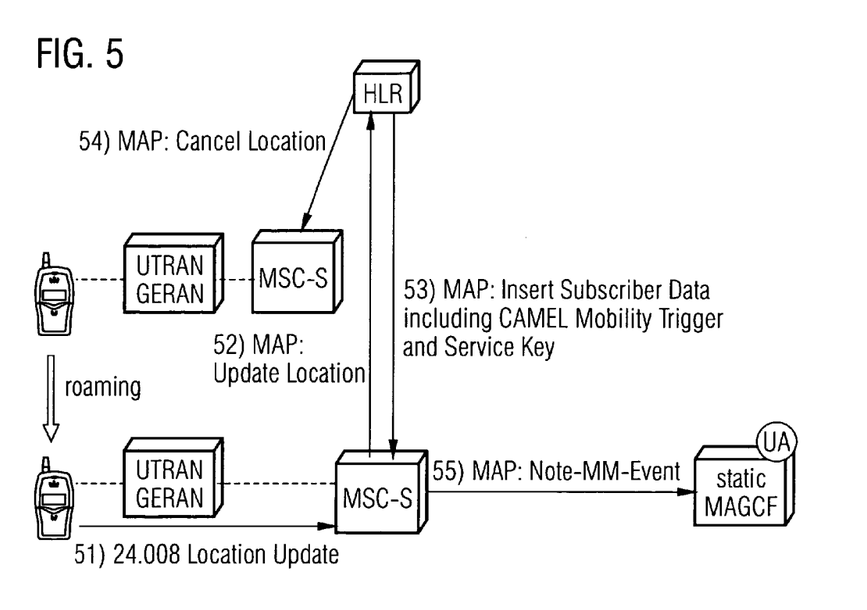
FIG. 5 shows a schematic embodiment for handling a user roaming between two MSC-S nodes.

FIG. 5 presents a user MS roaming from the serving MSC-S 1 to a new MSC-S 2, wherein the user is connected to the MSC-S 1 over the UTRAN GERAN network 1 and to the MSC-S 2 over UTRAN GERAN 2 network. There is also a HLR being responsible for both MSC-S 1 and MSC-S 2. Further a static MAGCF is depicted.

When entering the new location area, the terminal MS' sends a location update request to the new MSC-S 2. The location update is performed in step 51 by means of the message 24.008. When receiving the message, the new MSC-S, MSC-S 2 identifies the subscriber to be new in its serving area. Since this is a new subscriber in the MSC-S 2, the responsible HLR is contacted to inform about the location update, step 52, MAP:Update Location. The HLR inserts in step 53 subscriber data including CAMEL data into the MSC-S by means of MAP:Insert Subscriber Data, as it was described in connection with IMSI attach. In step 54 the HLR informs the old MSC-S that the subscriber has roamed into a new MSC-S 2 area. The HLR sends a MAP: Cancel Location message. After successful location update, CAMEL Mobility Trigger will cause the MSC-S to send a notification to the static MAGCF, step 55 MAP:Note-MM-Event. The static MAGCF sees that the notification comes from another node without MAGCF functionality, so it takes over the MAGCF role and therefore no further action required, since the static MAGCF retains the IMS registration for the user MS roaming between MSC-S 1 and MSC-S 2. Thus the static MAGCF has to be able to receive another Note-MM-Event notification while the IMS registration is active. In this case the MAGCF has to check preferably in a predefined list administered for example by the operator, whether the sending node has MAGCF functionality. If no, the static MAGCF has to store the new serving MSC-S address. The IMS registration is retained.

Figure 6:
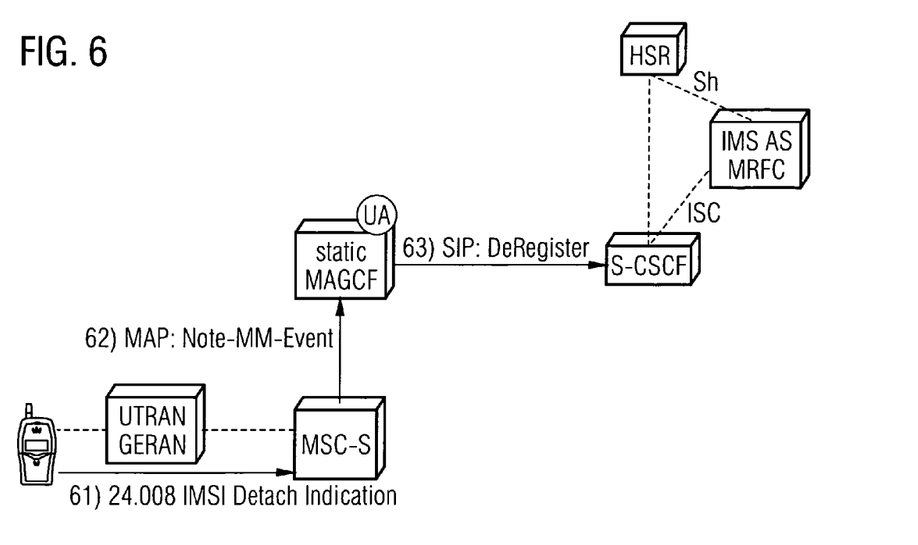
FIG. 6 shows a schematic embodiment for IMSI Detach in MSC-S.

In the following an embodiment is presented when a mobile terminal is for example switched off. In this case in the circuited-switched domain a IMSI Detach message is generated in the mobile terminal and sent to the corresponding node, preferably to the serving MSC-S in order to inform that the mobile terminal is not active which means that the calls are not to be routed to said mobile terminal. The case of IMSI Detach in MSC-S is presented in the following in respect to FIG. 6. The nodes are similar to the nodes described in connection to FIG. 5. In step 61 the mobile terminal MS sends IMSI Detach to the MSC-S, as it is already known. In step 62 the static MAGCF is notified thereabout, triggered by the CAMEL Mobility data, MAP:Note-MM-Event. Additionally, the MSC-S marks the subscriber as detached in VLR. Upon receiving the Note-MM-Event notification indicating IMSI detach the static MAGCF checks, whether it holds the IMS registration of the subscriber. If yes, the static MAGCF de-registers the subscriber in IMS, step 63 SIP:De-Register. Sending of the SIP:De-register message causes a de-registration of the user in the IMS system as it is already known. It is to be mentioned on the margin that SIP only knows Register message. Thus in order to deregister, one has to send Register message with time-out value 0.

In respect to FIG. 7 the case of Implicit Detach is discussed in the following. When the MSC-S does not receive a Periodic Location Update (which is a well known method for informing that a mobile terminal is still alive even if no calls are performed) from the mobile terminal for some time, the subscriber is marked as "Implicit Detached" in VLR after expiration of a timeout.

Figure 7:
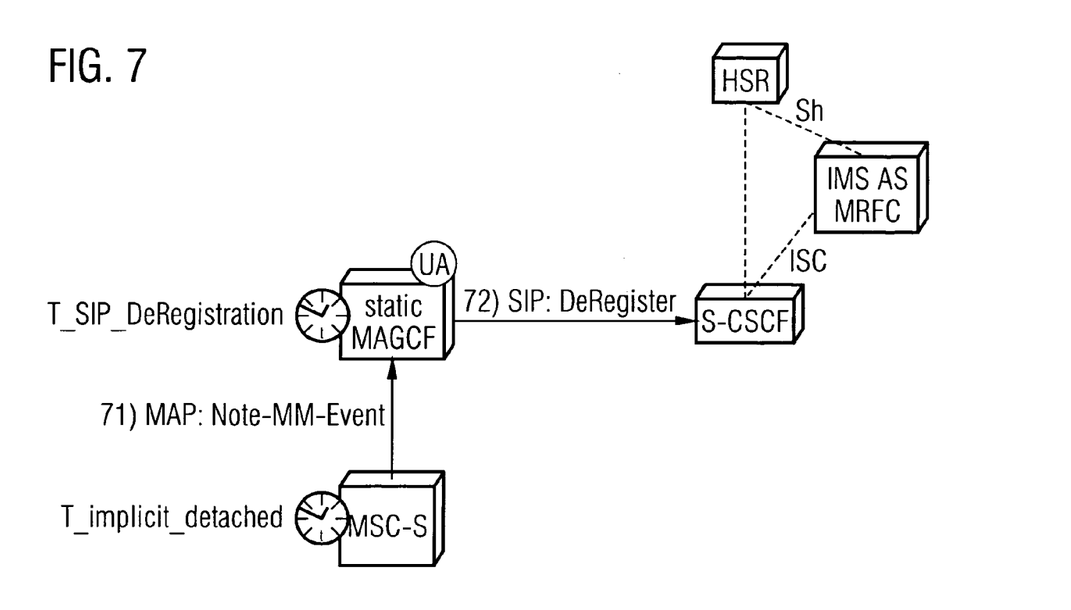
FIG. 7 shows a schematic embodiment for Implicit Detach in MSC-S.

This implementation of this procedure is depicted in FIG. 7 showing a MSC-S with a timer. After timeout, the subscriber is marked as Implicit Detached in VLR and CAMEL Mobility Management Trigger for Implicit Detach causes the MSC to send a notification to the static MAGCF. Thus, in step 71 the MAP: Note:MM-Event is sent. The static MAGCF starts a new timer named T_SIP_De-Registration. After timeout of this timer, the MAGCF de-registers the subscriber in the S-CSCF, step 72 SIP:De-Register.

In the aforementioned embodiments the MAGCF is presented as a stand-alone node, which means that it may be a single node for the whole network, or a number of stand-alone MAGCF nodes serve the whole network. The roaming procedures for these cases do not differ, regardless how many stand-alone MAGCF nodes are deployed in the network. However, the operator has the task to distribute all subscribers using IMS services to all the deployed static MAGCF nodes by doing proper provisioning of subscriber data in HLR. The CAMEL data 'gsmSCF address', points to the static MAGCF node. However this should not be seen as restriction, the static MAGCF method can also be applied in case that the MAGCF is co-located with a MSC-S. In this case in addition to the pure MSC-S-MSC-S roaming cases, also roaming cases from MSC-S to MAGCF/MSC-S and vice versa are to be considered. This scenario is discussed in the following in respect to FIG. 8

Figure 8:
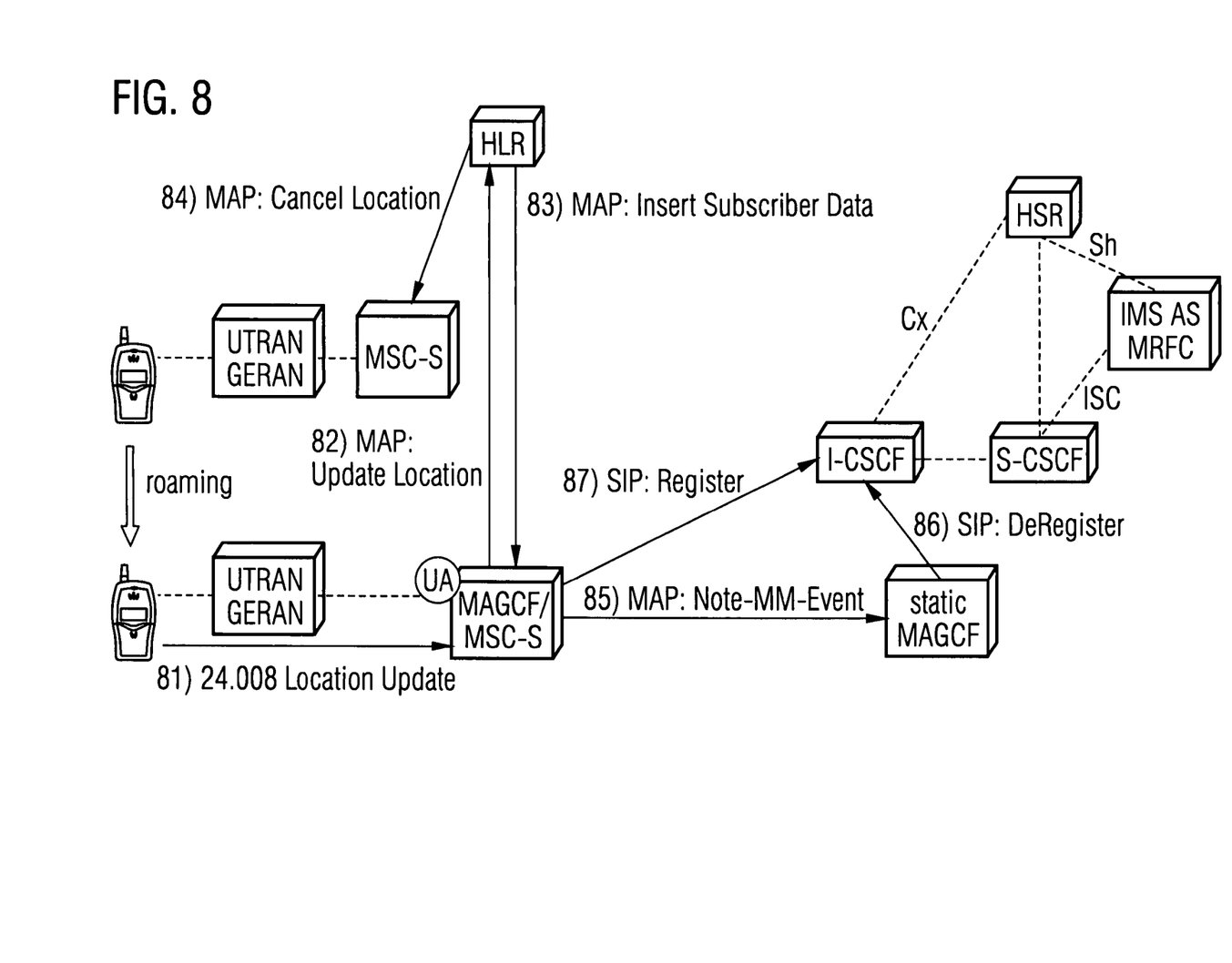
FIG. 8 shows a schematic embodiment for handling a user roaming between a MSC and a collocated MAGCF and, FIG. 9 shows a schematic embodiment for handling a user roaming between a collocated MAGCF and a MSC.

FIG. 8 depicts a mobile terminal MS roaming from the MSC-S 1 to the MAGCF/MSC-S 2. The rest of the nodes is similar to the nodes described in the previous embodiments.

In step 81, when entering the new location area, the terminal sends a location update request to the new MAGCF/MSC-S. When receiving the message, the subscriber is identified to be new to the MAGCF/MSC-S 2 node. Since this is a new subscriber in the MAGCF/MSC-S, the responsible HLR is contacted to inform about the location update, step 82. The HLR inserts subscriber data into the MSC-S. These subscriber data contain CAMEL Mobility Trigger and a specific CAMEL service key, step 83. Additionally the HLR sends a Cancel Location message to the previously used MSC-S node, in step 84 to MSC-S 1. After successful performed location update, CAMEL Mobility Trigger causes the MSC-S to send a notification to the static MAGCF. However, in this case the static MAGCF sees that the notification comes from a node that has MAGCF functionality. This information might be preferably administrated in a predefined list in the static MAGCF. Since the static MAGCF currently holds the IMS registration for the roaming user, therefore at first the static MAGCF has to deregister the subscriber from IMS. The de-registration is performed in step 85 by means of the MAP: Note-MM-Event message and in step 86 by means of SIP: De-Register message. Consequently the user agent in the MAGCF/MSC-S has the task to register the subscriber into IMS, step 87. The registration is performed as it is described beforehand.

Figure 9:
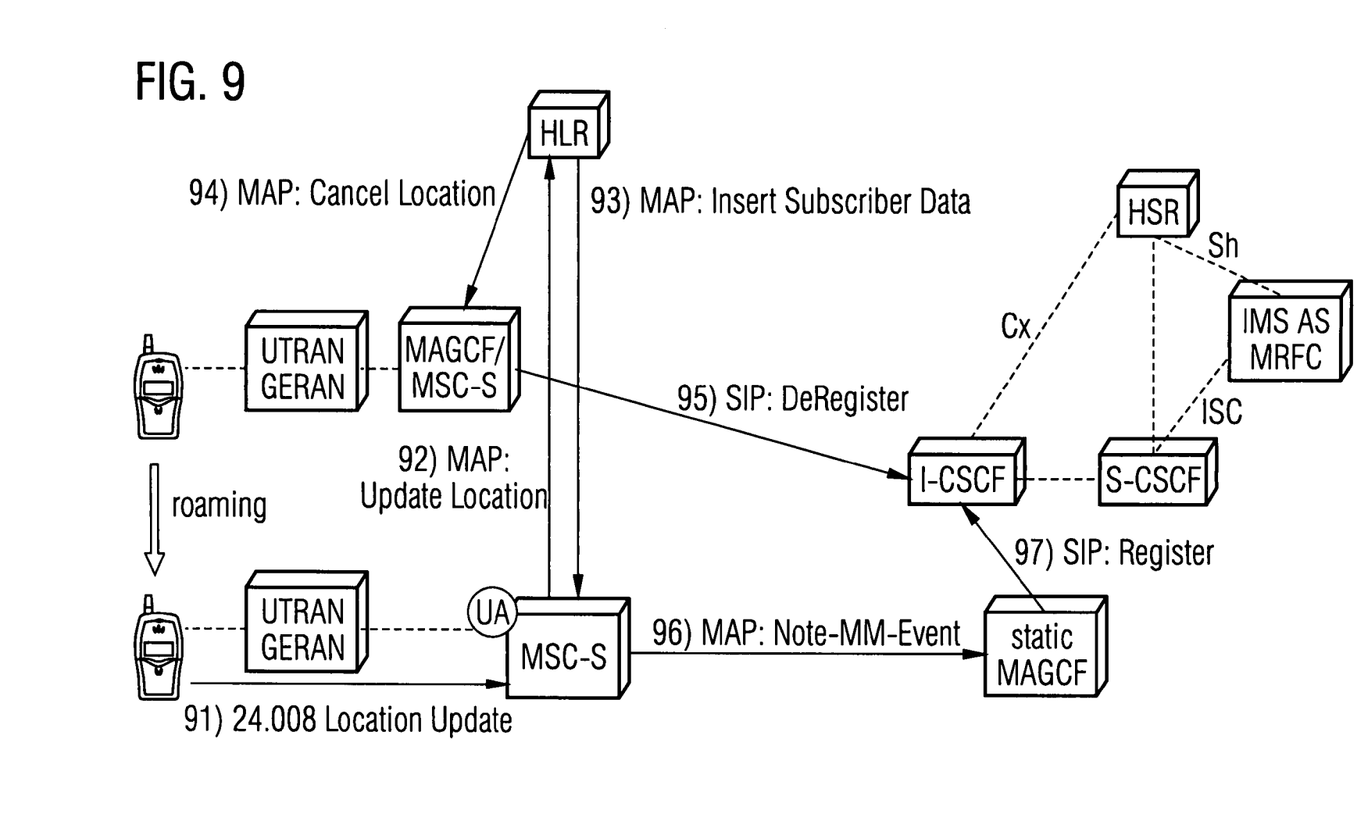

In a similar way it may happen during roaming, that the subscriber leaves the area of the co-located MAGCF/MSC-S and enters the area of an unmodified MSC-S. This embodiment is described in the following in connection with FIG. 9 presenting the same nodes as described in respect to FIG. 8 with the difference that the user roams from the MAGCF/MSC-S 1 to MSC-S 2. Similar as previously described, when entering the new location area, the terminal sends a location update request to the new MSC-S, step 91. When receiving the message, the subscriber is identified to be new to this node. Since this is a new subscriber in the MSC-S, the responsible HLR is contacted to inform about the location update, 92. The HLR inserts subscriber data into the MSC-S. These subscriber data contain CAMEL Mobility Trigger and a specific CAMEL service key, step 93. In step 94 Cancel Location is sent to the previously used co-located MAGCF/MSC-S 1 node. Said Cancel Location also triggers the co-located MAGCF to de-register the subscriber from the HLR, 95. After successful location update, CAMEL Mobility Trigger will cause the MSC-S to send a notification to the static MAGCF, step 96 MAP:note-MM-Event. However, in this case the static MAGCF sees that the notification comes from a node that does not have MAGCF functionality for example according to a predefined list in the static MAGCF. This causes the static MAGCF to register the subscriber into IMS, step 97.

The case of roaming between co-located MAGCF/MSC-S nodes is a combination of the previous two roaming cases and is described in the following without any figure. In this scenario one specific optimization is to be considered. Normally the CAMEL Mobility trigger would cause the new MAGCF/MSC-S node to send a Note-MM-Event notification to the static MAGCF. But since in this case there is no action needed from the static MAGCF, this notification is suppressed in the serving MAGCF/MSC-S. When receiving the location update request from the terminal, this message contains also the information on the last used location area. From this information the new MAGCF/MSC-S then finds out whether the previously serving node had also MAGCF functionality (predefined list in the MAGCF). If this is the case, the Note-MM-Event notification is suppressed.

The above-described embodiments are based on integration of cellular-switched controlled users equipment, like it is provided in GSM or GPRS, into IMS services developed in connection with UMTS. However, the present invention is not only restricted to these networks. A further example might be CDMA2000 providing corresponding nodes as the nodes existing in GPRS or UMTS.

The invention claimed is:

1. An Access Gateway Node for providing access to a packet-based multimedia system for a user with a circuit switched controlled user's terminal having a circuit-switched controlled access for communicating with a circuit switched controlled domain and being served by the circuit-switched controlled domain, wherein the user's terminal is not performing a registration in the packet-based multimedia system, wherein said Access Gateway Node includes a processor coupled to a memory for storing computer program instructions, wherein when the processor executes the computer program instructions, the Access Gateway Node is caused to perform the following:

receive a trigger message related to the circuit-switched controlled user's terminal from the circuit-switched controlled domain over the circuit-switched controlled access including a circuit-switched related parameter;

provide packet-based multimedia system parameters, wherein at least one packet-based multimedia system parameter is derived from the circuit-switched related parameter; and provide an access to the packet-based multimedia system based on the at least one packet-based multimedia system parameter by means of a user agent therein handling the registration on behalf of the user in the packet-based multimedia system and by means of a proxy call session control function therein being a contact point for communicating with the packet-based multimedia system, wherein the at least one packet-based multimedia system parameter is used by the user agent to register the circuit-switched controlled user's terminal in the packet-based multimedia system.

2. The Access Gateway Node according to claim 1, wherein the at least one packet-based multimedia system parameter is an address used for accessing the packet-based multimedia system.

3. The Access Gateway Node according to claim 1, wherein the circuit-switched related parameter is an address for identifying a subscriber in the circuit-switched controlled domain.

4. The Access Gateway Node according to claim 1, wherein the proxy call session control function provides call handling in the packet-based multimedia system.

5. The Access Gateway Node according to claim 1, wherein the user agent is configured to de-register the circuit-switched controlled user's terminal from the packet-based multimedia system.

6. The Access Gateway Node according to claim 1, further configured to keep the registration in the packet-based multimedia system alive based on location update triggers.

7. A method of providing access to a packet-based multimedia system for a circuit-switched controlled user's terminal using an Access Gateway Node, wherein the circuit-switched controlled user's terminal has a circuit-switched controlled access for communicating with a circuit-switched controlled domain and is served by the circuit-switched controlled domain, and wherein the user's terminal is not performing a registration in the packet-based multimedia system, wherein the method comprises the following steps to be performed by the Access Gateway Node:

receiving a trigger message related to the circuit-switched controlled user's terminal from the circuit-switched controlled domain over the circuit-switched controlled access, wherein the trigger message includes a circuit-switched related parameter;

deriving at least one packet-based multimedia system parameter from the circuit-switched related parameter; and providing the circuit-switched controlled user's terminal with access to the packet-based multimedia system based on the at least one packet-based multimedia system parameter utilizing a user agent handling the registration on behalf of a user in the packet-based multimedia system, and a proxy call session control function being a contact point for communicating with the packet-based multimedia system, wherein the at least one packet-based multimedia system parameter is used by the user agent to register the circuit-switched controlled user's terminal in the packet-based multimedia system so as to enable the user's terminal to access the packet-based multimedia system.

8. The method according to claim 7, wherein services from the packet-based multimedia system are provided to the circuit-switched controlled user's terminal as part of the user's terminal's access to said packet-based multimedia system.

9. The method according to claim 7, wherein the trigger message carrying the circuit-switched related parameter is a message suitable for exchanging information within the circuit-switched controlled domain.

10. The method according to claim 7, wherein a circuit-switched address and a packet based address are stored in order to reach the user while providing the packet-based services.

* * * * *

UNITED STATES PATENT AND TRADEMARK OFFICE
CERTIFICATE OF CORRECTION

| | |
|---|---|
| PATENT NO. | : 8,532,091 B2 |
| APPLICATION NO. | : 12/161134 |
| DATED | : September 10, 2013 |
| INVENTOR(S) | : Witzel et al. |

Page 1 of 1

It is certified that error appears in the above-identified patent and that said Letters Patent is hereby corrected as shown below:

In the Claims

Column 12, Line 51, Claim 10, delete "providing the" and insert -- providing --, therefor.

Signed and Sealed this
Thirteenth Day of May, 2014

Michelle K. Lee
*Deputy Director of the United States Patent and Trademark Office*